United States Patent [19]

Lewis

[11] 3,850,383
[45] Nov. 26, 1974

[54] SEAT BELT RETRACTOR APPARATUS

[76] Inventor: Gerald F. Lewis, 1850 Columbia, Berkley, Mich. 48072

[22] Filed: Mar. 8, 1972

[21] Appl. No.: 232,822

[52] U.S. Cl. .............................................. 242/107.4
[51] Int. Cl. ..................... A62b 35/02, B65h 63/00
[58] Field of Search ...... 242/107.4, 107.5 B, 107 R; 280/150 SB; 297/288, 286, 387; 200/61.45 R

[56] References Cited
UNITED STATES PATENTS

| | | | |
|---|---|---|---|
| 2,650,655 | 9/1953 | Neahr | 242/107.4 |
| 2,701,693 | 2/1955 | Nordmark | 242/107.4 |
| 2,708,966 | 5/1955 | Davis | 242/107 SB |
| 2,825,581 | 3/1958 | Knight | 242/107.4 |
| 3,488,462 | 1/1970 | Gianotto | 200/61.45 R |
| 3,508,720 | 4/1970 | Kell | 242/107.4 |
| 3,521,832 | 7/1970 | Rex | 242/107.4 |
| 3,610,361 | 10/1971 | Pringle | 242/107.4 |
| 3,635,420 | 1/1972 | Romanzi, Jr. | 242/107.4 |

Primary Examiner—John W. Huckert
Assistant Examiner—Jon W. Henry
Attorney, Agent, or Firm—Hugh L. Fisher

[57] ABSTRACT

Seat belt retractor apparatus having a spring biased latching device for locking the seat belt in a selected extended position. The latching device has a latching bar that is releasably held in an unlatched position by an inertia operated device so as to permit free retracting and extending movement of the belt. When an inertia force of a certain magnitude is imposed on the locking device, the latching bar is released by the inertia operated device and then biased to the latched position in which further extension of the belt is restrained. The inertia operated device employs in the different depicted embodiments a depending pendulum or an inverted pendulum which in response to an inertia force of a selected magnitude in any direction initiates the release of the latching bar.

15 Claims, 15 Drawing Figures

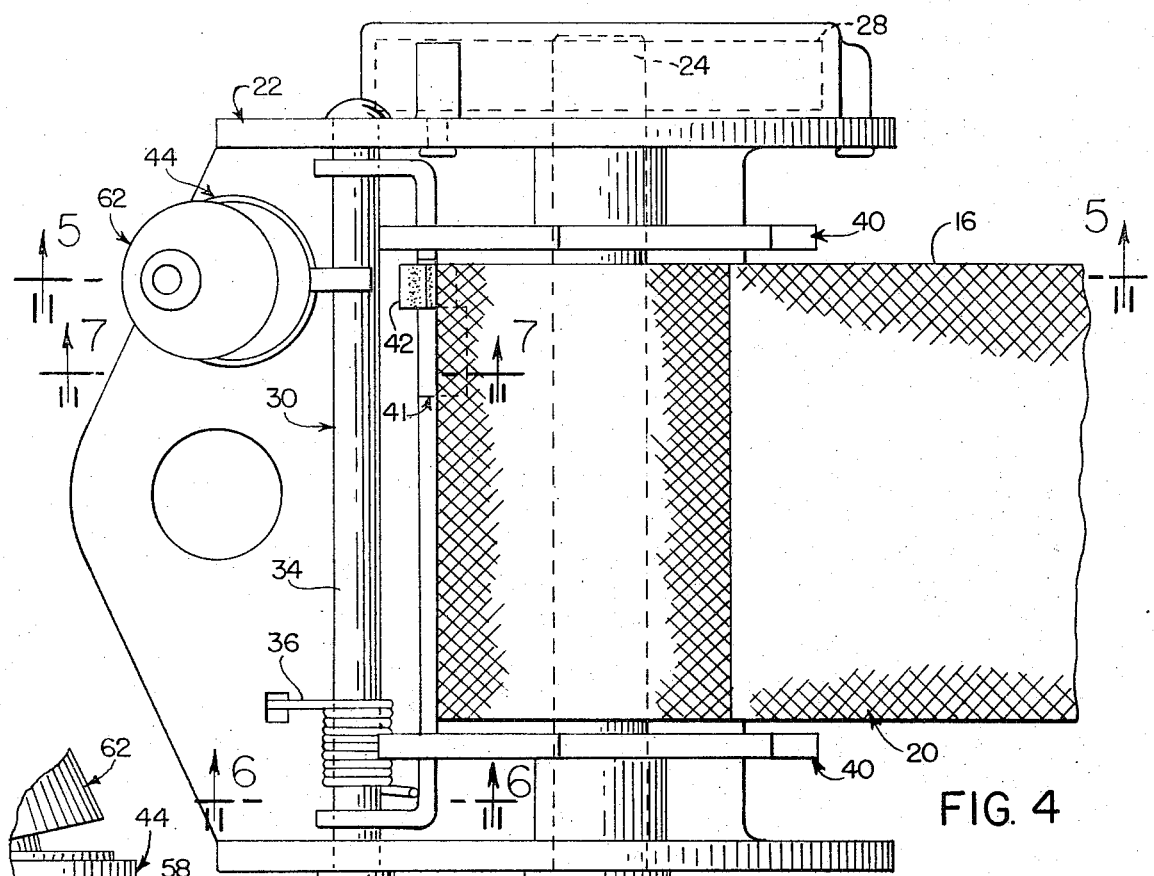
FIG. 4
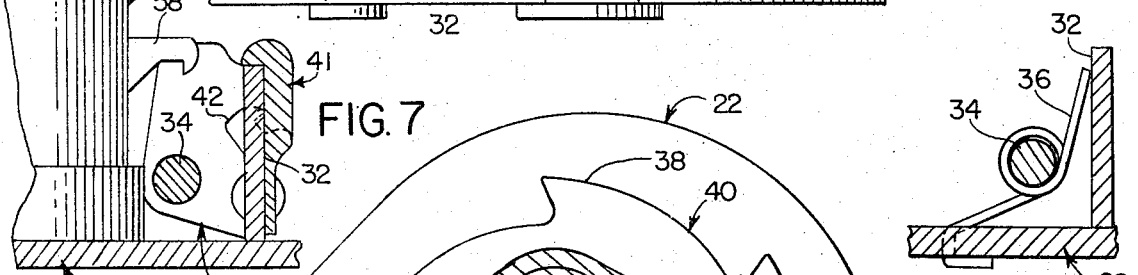
FIG. 6
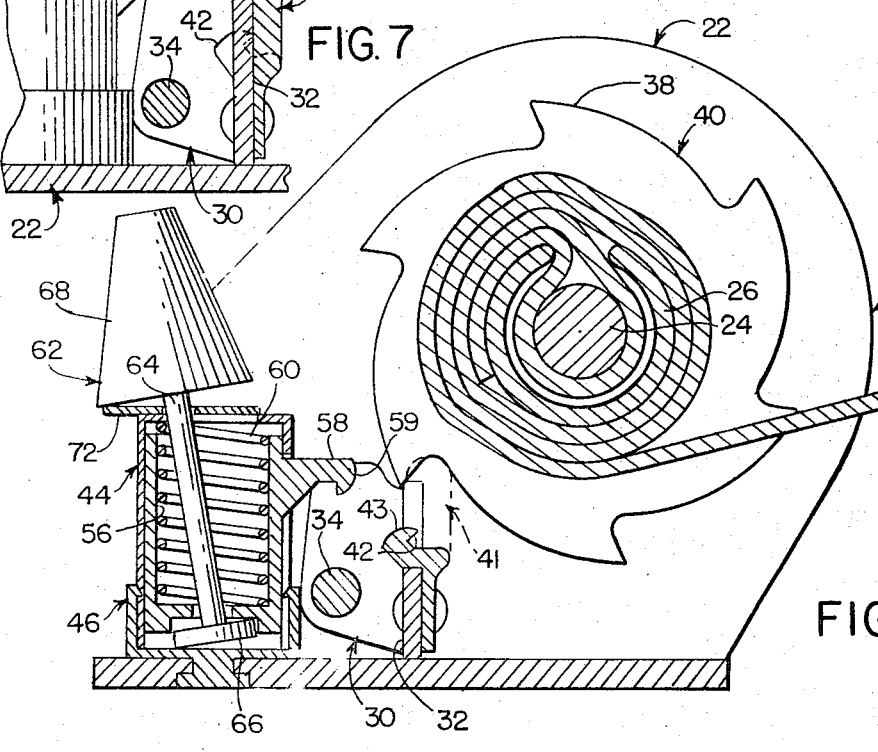
FIG. 7
FIG. 5

SEAT BELT RETRACTOR APPARATUS

This invention relates to improvements in seat belt retractor apparatus and particularly inertia operated seat belt retractor apparatus.

The usual seat belt retractor is installed on the outboard side of the vehicle seat and when the seat belt is not in use, stores it so it will not be caught in the door or become entangled and hence, is always conveniently available. To provide the required restraint, it is necessary that the retractor have a latch that engages the teeth on a belt reel connected ratchet wheel so as to resist further unwinding movement of the belt once it is in a selected position. For this reason, the latching can occur prematurely prior to the seat belt being buckled or even when buckled it can be too tight so as to be both uncomfortable and too restrictive. To avoid this, various inertia operated devices have been proposed that prevent the latch from latching until acceleration or deceleration forces acting on the inertia operated device cause it to force the latch to the latched position. These inertia operated devices employ a pendulum which acts directly on the latch and therefore, they must be of a relatively substantial weight in order to effect the direct latching. Also when either the acceleration or deceleration forces are sufficient to initiate movement of the pendulum and accordingly the latch at a time when the ratchet teeth and the latch are misaligned, there cannot be an engagement. If subsequently the acceleration or deceleration force is momentarily relieved, the pendulum will return to its normal position and there will have been no engagement and hence, no restraint particularly if the inertia force is reimposed on the vehicle.

With the foregoing in mind a new and different latching type seat belt retractor is contemplated that cannot latch prematurely, that allows freedom of movement of a seat belt user, and that latches in a positive manner when restraint is needed.

Also contemplated is a latching type seat belt retractor incorporating a latching device that is always biased to a latched position to provide positive restraint and that is maintained in an unlatched position by an inertia operated device which is responsive to inertia forces in all directions.

Further contemplated is a seat belt retractor incorporating a latching device that is biased from an unlatched position to a latched position in which the seat belt is restrained from extension and utilizes a relatively small size inertia operated device to retain the latching device in the unlatched position until an inertia force of a predetermined magnitude is imposed thereon.

Other objects include the provision of a novel inertia operated device that employs a minimum of easily fabricated parts; that is uniquely constructed so as to be protected from dust and dirt during use, and that can be made sensitive to relatively small inertia forces in any direction and that is positive in operation.

The foregoing and other objects and advantages of the invention will become apparent from the following description and the accompanying drawings in which:

FIG. 4 is another plan view of the seat belt retractor showing the seat belt extended;

FIG. 5 is a sectional view taken along line 5—5 in FIG. 4 showing the latched device in its latched position;

FIG. 6 is a fragmentary sectional view taken along line 6—6 in FIG. 4 showing a spring for biasing the latching device to the latched position;

FIG. 7 is a fragmentary sectional view taken along line 7—7 in FIG. 4 depicting the relationship of the inertia operated device and the latching device in the latched position;

Figure 12:
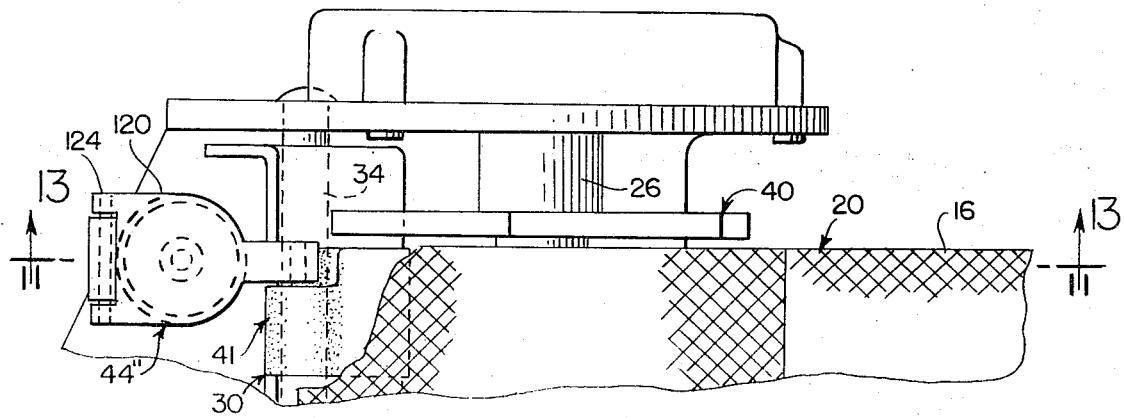
FIG. 12 is a partial plan view of another alternate embodiment of the inertia operated device.
Figure 13:
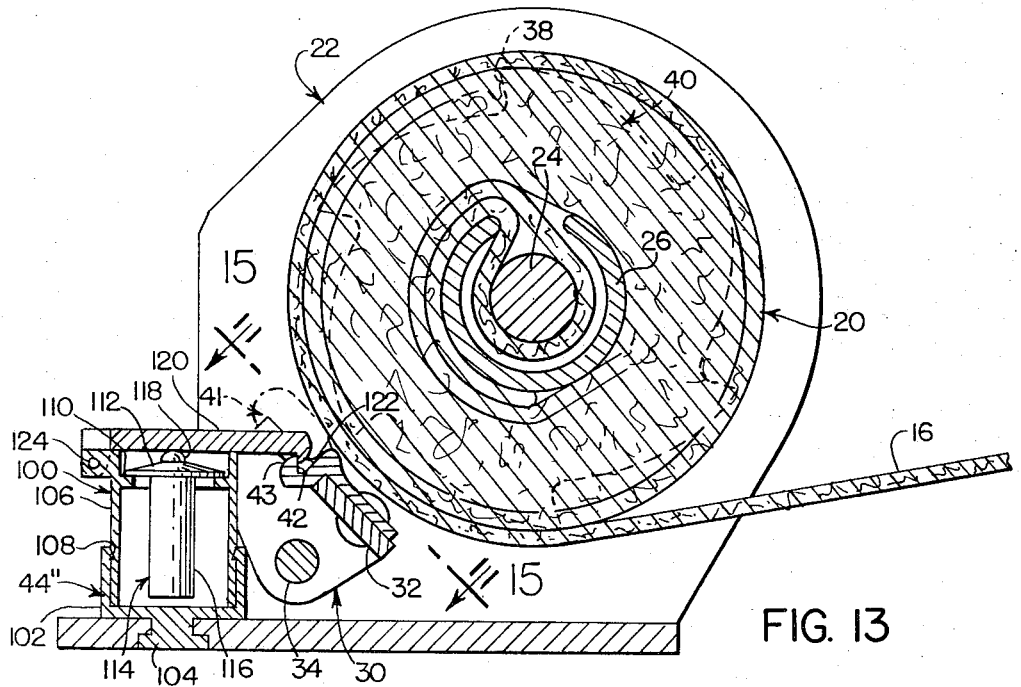
FIG. 13 is a sectional view similar to FIG. 2 taken along line 13—13 in FIG. 12 showing the FIG. 12 inertia operated device in the locked position and the latching device in its unlatched position.
Figure 14:
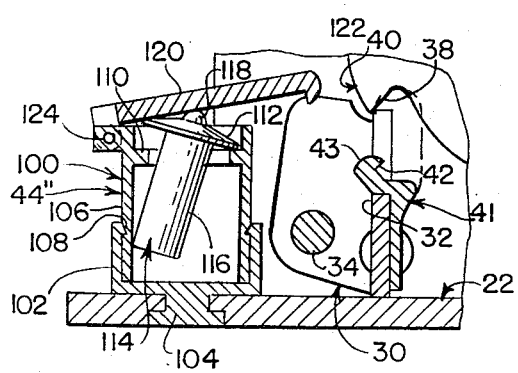
Figure 15:
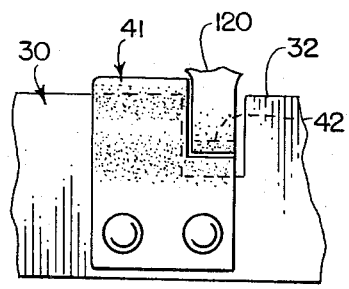

FIG. 14 is a fragmentary sectional view similar to FIG. 13 showing the FIG. 12 inertia operated device in its unlocked position and the latching device in its latched position; and FIG. 15 is a fragmentary view looking in the direction of arrows 15—15 in FIG. 13 showing the interrelationship of the inertia operated device and the latching device when in the unlatched position of the latching device.

Figure 8:
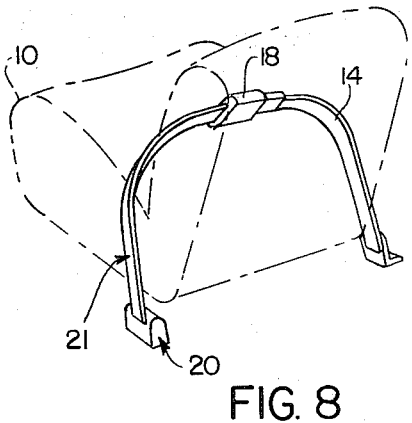
FIG. 8 is a schematic illustration of the seat belt retractor installed on a seat for a vehicle.

Referring first to FIG. 8 the numeral 10 denotes generally a vehicle seat and the number 12 a seat belt. The seat belt comprises an inboard belt section 14 and an outboard belt section 16. These belt sections 14 and 16 are joined together by the usual seat belt buckle 18. Th inboard belt section 14 is connected to the vehicle frame or the like in the usual way, whereas the outboard belt section 16 is joined to the vehicle frame through a seat belt retractor shown generally at 20. The function of the seat belt retractor 20 is to retract the outboard belt section 16 to keep it from getting caught in the door or tangled. The seat belt retractor 20 is of the latching type so it only latches as will be explained when there is an inertia force from an impact or something similar where it is required that the seat belt 12 restrain the occupant of the seat.

Figure 1:
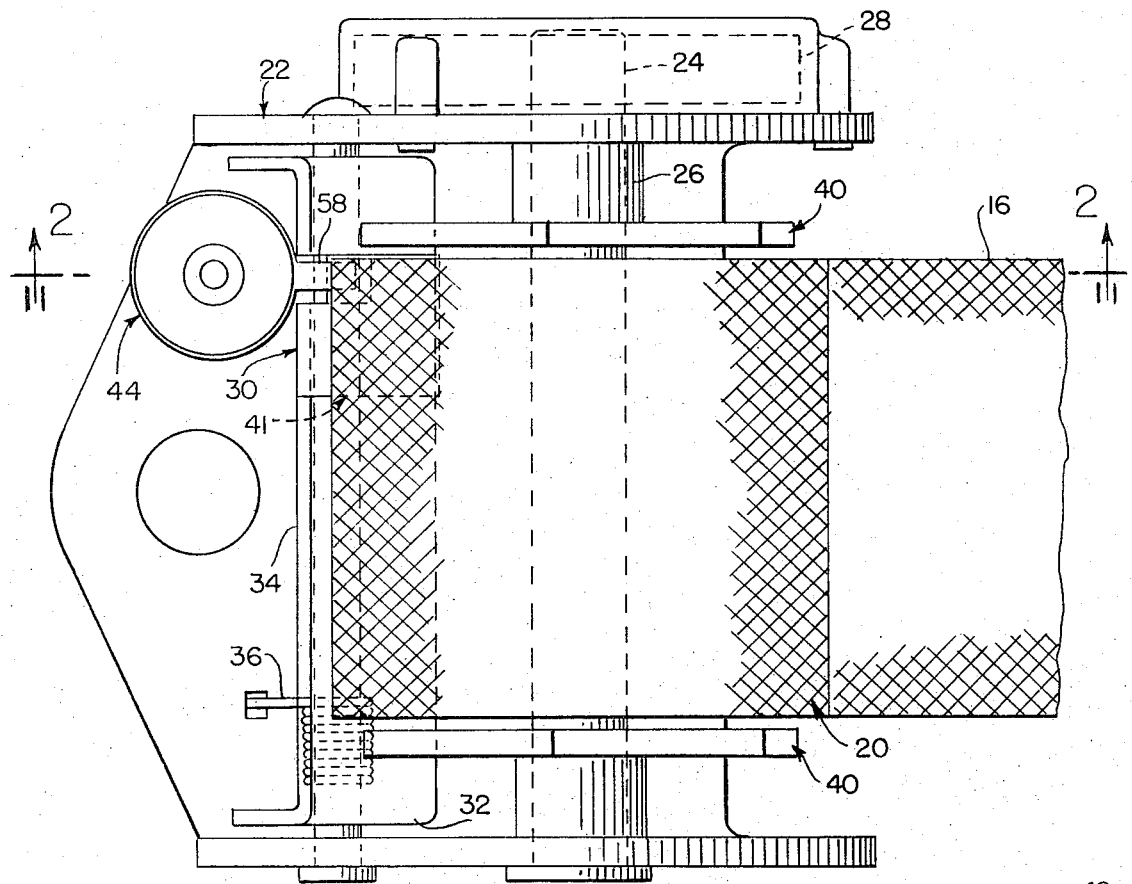
FIG. 1 is a plan view of a seat belt retractor incorporating the principles of the invention showing the seat belt retracted.
Figure 3:
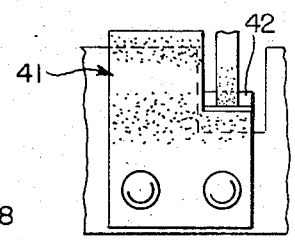
FIG. 3 is a fragmentary view of the latching device looking in the direction of arrows 3—3 in FIG. 2.
Figure 2:
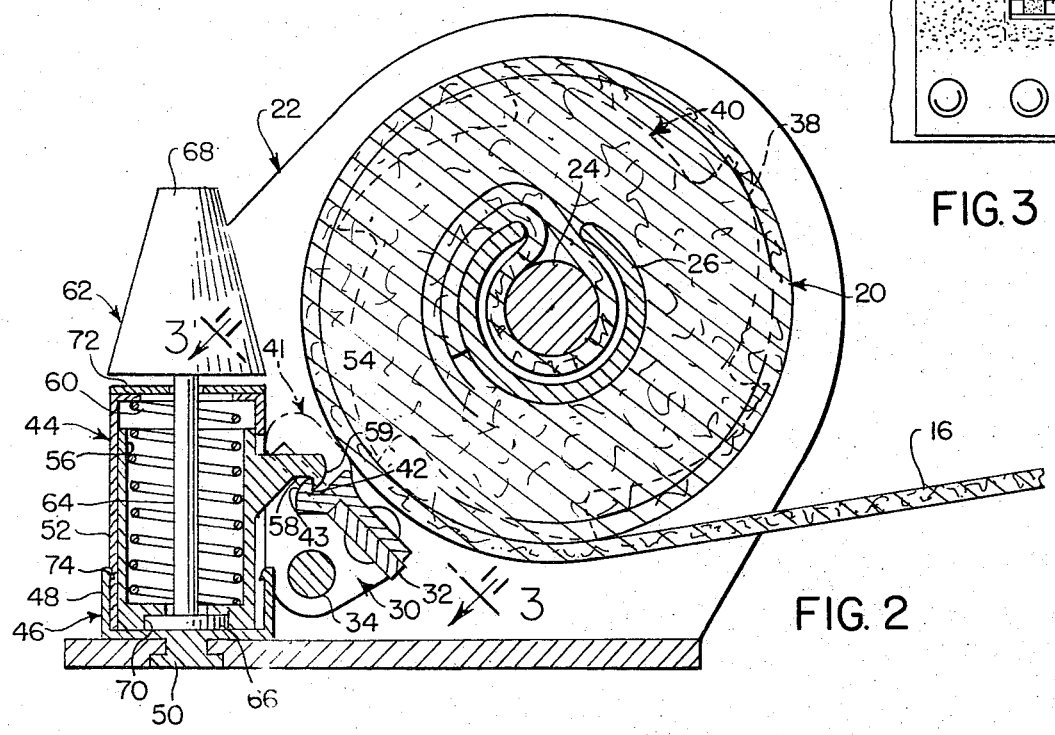
FIG. 2 is a sectional view taken along line 2—2 in FIG. 1 showing a latching device being held in its unlatched position by an inertia operated device.

Considering now FIG. 1, the retractor 20 can be of many different forms. For purposes of demonstration and without limitation the retractor 20 depicted comprises a U-shaped frame 22 which is bolted or otherwise secured to a vehicle frame (not shown). The frame 22 includes a cross shaft 24 on which a belt reel 26 is revolvably supported. The retraction is accomplished by reel bias provision such as a clock type spring 28 which biases the reel 26 in the belt retracting direction so that the belt section 16 will be wound or retracted on the reel 26 as shown in FIG. 2.

The latching of the belt section 16 in the desired extended position is done by a latching device denoted generally by the numeral 30. As viewed in FIGS. 4 and 5, the latching device 30 comprises a latch element such as a latching bar 32 which is revolvably supported on a frame supported cross shaft 34. The latching bar 32 is urged to the FIG. 5 latched position by a spring 36 which as best shown in FIG. 6 has one end anchored to the frame 22 and the other end in engagement with an edge of the latching bar 32. In the FIG. 5 latched position the latching bar 32 engages a tooth 38 on a ratchet wheel 40, which is either integral with the reel 26 or suitably fastened thereto.

As will be noted in FIG. 5, the shape of the teeth 38 is such that they cam the latching bar 32 counterclockwise as the reel 26 is moved in the belt retracting direction by the clock type spring 28 and hence, do not interfere with the retraction. During this retraction, as the belt winds on the reel 26 it will ultimately engage a felt follower portion of the latching bar 32 such as an arm 41 which can be appropriately joined to the latching bar 32 or made integral therewith. For reasons to be explained, this arm 41 includes a hook portion 42 which has an arcuate surface 43. This hook portion 42 can be separate from the arm 41 if desired. When the belt section 16 does engage the arm 41, the latching bar 32 will be rotated counterclockwise to the unlatched position viewed in FIG. 2.

As has been discussed, to prevent premature latching or to prevent the seat belt 12 from being too tight when latching occurs, an inertia operated device 44 is employed. This inertia operated device 44 will maintain the latching bar 32 in the unlatched position until there is an inertia force of a certain magnitude resulting from extreme vehicle acceleration or deceleration, e.g., from an impact where it is manditory that the seat belt 12 provide restraint. Under these conditions the inertia operated device 44 will release and permit the latching bar 32 to assume its latching position to provide this restraint. In the meantime there is no concern for premature latching and the user of the belt is more comfortable.

Considering first the FIG. 2 embodiment, the inertia operated device 44 displayed comprises a support provision such as a guide 46 which can be integral with the frame 22 or separate as depicted. This guide 46 has a cup shaped member 48 which is fixedly retained to the frame 22 by a flange portion 50. Secured to this cup shaped member 48 is a hollow cylinder 52 that has an elongated slot 54 that extends axially along one side of the cylinder 52. Slidably positioned within this guide 46 is a locking provision including a locking element 56 having a paw like locking portion 58 that extends through the slot 54. A coil spring 60 urges the locking element 56 to the FIG. 2 position.

The locking element 56 and accordingly the locking portion 58 are moved up and down by a pendulum shown generally at 62. This pendulum 62 is constructed as will be discussed for response to inertia forces from all directions. Structurally the pendulum 62 has a rod 64 that terminates in a flange 66 at its lower end and at its upper end has a weighted portion such as a tapered weight 68. The flange 66, fits within an angular recess 70 at the bottom of the locking element 56. A cover 72 is positioned on the pendulum rod 64 for movement therewith and seats on the upper end of the guide 46 so as to prevent the entry of dust and dirt into the assembly regardless of the position of the pendulum 62. Once the assembly is completed the cup shaped member 48 and the sleeve 52 can be crimped or otherwise secured at 74.

To explain the operation of the retractor 20 and the inertia operated device 44, reference will be first made to FIG. 2. As mentioned, FIG. 2 displays the latching device 30 in its unlatched position. This unlatched position is maintained by the inertia operated device 44 due to the interengagement of the locking portion 58 of the locking element 56 and the hook portion 42 of the arm 41 in the locked position of the inertia operated device 44. Thus, the seat belt section 16 can be extended freely without latching occuring and of course, retraction can be carried out as before. If now the vehicle is subjected to either acceleration or deceleration forces of a certain magnitude such that restraint is required, the resultant inertia force will be imposed on the inertia operated device 44 and the pendulum 62 will be tilted to the FIG. 5 unset position. The magnitude of the inertia force to which the pendulum 62 will response will be determined by the ratio of the length of the rod 64, the size of the weight 68, the diameter of the flange 66 and of course, the bias from the spring 60. Also, because the construction permits the pendulum 62 to tilt in any direction, the pendulum 62 will respond to the inertia forces regardless of direction; e.g., along the fore and aft axis of the vehicle, from the side or any direction in between. In this unset position of the pendulum 62, the locking element 56 is moved upwardly so that the locking portion 58 will become disengaged from the hook portion 42 of the arm 41 on the latching bar 32 and the inertia operated device 44 will assume its FIG. 5 unlocked position. Hence, the latching bar 32 will assume its FIG. 5 latched position in which it is in engagement with one of the ratchet wheel teeth 38 and grounds the ratchet wheel 40 to the frame 22. Further rotation in an unwinding direction of the belt section 16 is now restrained.

It will be noted that the bias from the spring 36, once the inertia operated device 44 assumes the FIG. 5 position, constantly urges the latching bar 32 towards the latching position. Therefore, if the latching bar 32 engages a top portion of the tooth 38 at a time when the inertia forces are momentarily relieved, for instance acceleration or deceleration momentarily ceases, this spring 36 will continue to exert a bias so that slightly further unwinding movement of the belt section 16 insures that the latching bar 32 will assume the FIG. 5 latched position.

Subsequently when the belt section 16 is rewound by the retractor 20, the belt section 16 will engage the arm 41 and move the latch bar 32 to its FIG. 2 unlatched position. During this rewinding movement, the arcuates surfaces 59 and 43 respectively on the locking portion 58 of the locking element 56 and on the hook portion 42 of the latch bar arm 41 will, due to the camming action, effect a reengagement of the locking portion 58 and the hook portion 42 so that the inertia operated device 44 and the latching device 30 will each respectively assume their FIG. 2 locked and unlatched positions. The coil spring 60 and the locking element 56 will through the flange 66 of the pendulum 62 return it to its FIG. 2 set position once the inertia force is removed.

Figure 9:
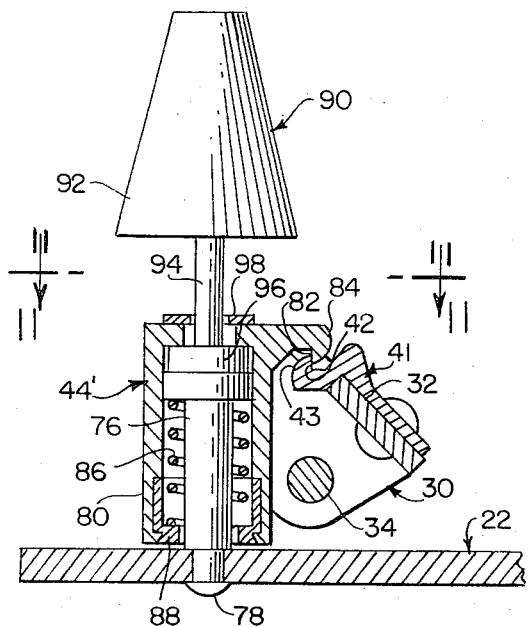
FIG. 9 is a sectional view of an alternate embodiment of the inertia operated device shown in the locked position.
Figure 11:
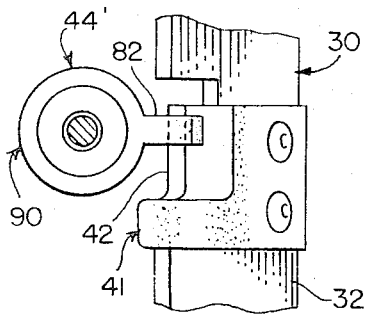
FIG. 11 is a fragmentary sectional view of the FIG. 9 alternate embodiment taken along line 11—11 in FIG. 9.
Figure 10:
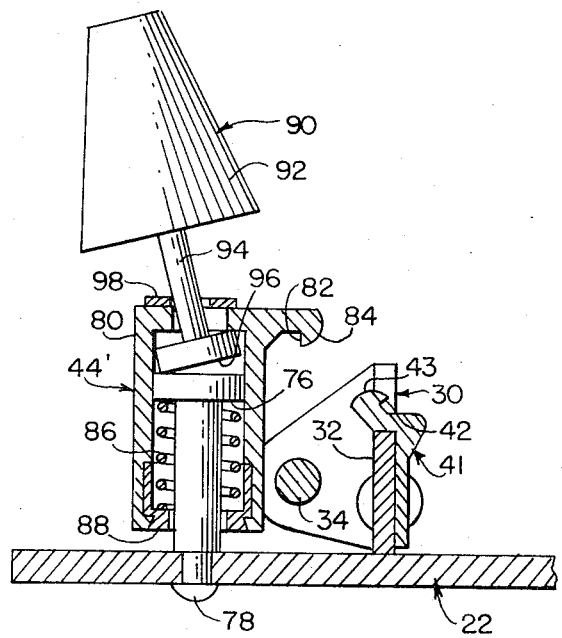
FIG. 10 is a sectional view similar to FIG. 9 showing the FIG. 9 alternate embodiment in its unlocked position.

In FIGS. 9, 10 and 11 a modified inertia operated device 44' is depicted comprising a guide 76 which is in the form of piston attached at 78 to the frame 22. A movable locking element 80 slides up and down on the guide 76 and has a pawl like locking portion 82 with an arcuate surface 84 and thus are similar respectively to the FIG. 2 locking element 56 and its arcuate surface 59. A coil spring 86 urges the locking element 80 to the FIG. 9 position and is held in place by a cap 88 which is insertable in the bottom of the locking element 80. A pendulum 90, comprising a tapered weight 92, a rod 94 and a flange 96, is seated with the flange 96 on top of the guide 76 as displayed in FIG. 9. A dust cover 98 surrounds the rod 94 and is slidably positioned on the top of the locking element 80 to serve the same function as the dust cover 72 in the FIG. 2 embodiment.

Operationally, the inertia operated device 44' with the latching device 30 in the unlatched position will be as shown in FIG. 9 with the locking portion 82 of the locking element 80 engaging the hook portion 42 of the arm 41 so as to maintain the latching bar 32 in its unlatched position. If now, the pendulum 90 has imposed thereon from any direction an inertia force of a magnitude determined by the ratio of mass of the weight 92, the length of the rod 94, the diameter of the flange 96 and the bias from the coil spring 86, the pendulum 90 will be unset and tilted as displayed in FIG. 10 when the pendulum 90 is moved to the FIG. 10 unset position, the flange 96 will raise the locking element 80 upwardly against the bias from the spring 86. This movement will disengage the locking portion 82 and the hook portion 42 so that the spring 36 will be effective to urge the latching bar 32 to the latched position and into engagement with the ratchet wheel 40 so that the belt section 16 cannot be extended any further. Once the inertia force is removed the pendulum 90 will be uprighted by the coaction between the guide 76, the flange 96 and the coil spring 86 which will exert a downward bias to upright the pendulum 90. Subsequently, when the seat belt section 16 is retracted by the retractor 20, the locking portion 82 and the hook portion 42, due to the interaction of their arcuate surfaces 84 and 43 and the belt section's engagement with the arm 41, will be returned to the FIG. 9 locked position in which the latching device 30 is retained in its unlatched position.

FIGS. 12, 13, 14 and 15 display still another modification of the inertia operating device which is denoted generally by the numeral 44". As shown, the device 44" comprises a guide in the form of a housing shown generally at 100. This housing 100 has a cup shaped member 102 secured to the frame by a flange 104 and a sleeve 106, that is attached as by crimping or the like at 108 to the cup shaped member 102. The sleeve 106 has a seating surface 110 on which is positioned a flange portion 112 of a pendulum 114. The pendulum 114 has a weight 116 downwardly depending from the flange 112. The pendulum 114 also has an arcuate tip 118 at its top. This tip 118 engages the underside of a locking element 120. This locking element 120 has a locking portion 121 provided with an arcuate surface at 122 and is pivotally joined at 124 to the housing 100 so as to permit rocking movement of the locking element 120 in the FIG. 13 locked position of the device 44", the locking element 120 serves as a cover for the assembly.

Describing now the operation of the inertia operated device 44", the pendulum 114 in its FIG. 13 set position will permit the locking portion 121 of the locking element 120 to engage the hook portion 42 of the arm 41 on the latching bar 32 so that the inertia operated device 44" now will be in its locked position and hold the latching bar 32 in its FIG. 13 retracted position. When the pendulum 114 is subjected to the selected inertia force in any direction, the pendulum 114 will tilt and move to the unset position displayed in FIG. 14. In moving to this unset position the pendulum arcuate tip 118, will raise the locking element 120 out of engagement with the hook portion 42 so that the inertia operated device 44" will be in its FIG. 14 unlocked position. Hence, the latching bar 32 will move to the latched position to provide the required restraint against further extension of the belt section 16. Once the inertia force is removed, the pendulum 114 will be returned by gravity to the FIG. 13 set position and the locking element 120 will drop back down also to the FIG. 13 locked position, so that when the belt section 16 is retracted, the hook portion 42 and the locking portion 121 will interengage to hold the locking device 30 in its retracted position. Again the coaction between the locking portions arcuate surface 122 and the hook portions arcuate surface 43 will effect this interengagement. If desired, the locking element 120 can include a spring (not shown) similar to the spring 36 to insure return of the locking element 120 to the FIG. 13 locked position, otherwise, it is intended that gravity will return the locking element 120 and correspondingly the pendulum 114 to the set position viewed in FIG. 13.

From the foregoing, it will be appreciated that the various inertia operated devices 44, 44' and 44" each actuate a locking element that holds a spring biased latching bar 30 in the unlatched position. Hence, the devices can employ a substantially smaller inertia weight than if they acted directly on the latch bar 32. Furthermore, the latching device 30 is always biased to the latching position so that if there is misalignment between the latching bar 32 and the ratchet wheel teeth 38 when the predetermined inertia force in any direction is exceeded, any slight subsequent movement of the belt section 16 will insure that the engagement between the latching bar 32 and the ratchet wheel teeth 38 does occur to provide the required restraining protection. Also the inertia operated devices have a simple construction with a minimum parts so that size-wise the devices are relatively small, inexpensive to manufacture, and consumes a minimum space.

What is claimed is:

1. In a seat belt retractor; the combination of a frame having a reel rotatably supported thereon; a seat belt wound on the reel; reel bias means urging the reel to a belt retracted position; latching means resisting rotation of the reel in a belt extended direction; the latching means including ratchet means revolvable with the reel and a latch element rotatably positioned on the frame, latch bias means urging the latch element to a latched position in engagement with the ratchet means so as to prevent belt extending rotation of the reel, belt follower means fixed to the latch element for moving the latch element to an unlatched position out of engagement with the reel by contact with the belt when retracting thereby permitting rotation of the reel in both belt retracted and belt extended directions; and inertia operated means operative to engage the latch element for maintaining the latch element in the unlatched position, the inertia operated means also being operative to disengage the latch element so as to release the latch element in response to inertia forces of a certain magnitude acting upon the inertia operated means in any direction so as to permit the latch element to be moved by the latch bias means to the latched position and thereby restrain belt extending rotation of the reel, the inertia operated means including pendulum means, support means on the frame supporting the pendulum means for movement in any direction from a set position to an unset position in response to the inertia forces of the certain magnitude, the pendulum means being arranged so as to return to the set position upon removal of the inertia forces, locking means maneuverable, when the pendulum means is moved from the set position to the unset position thereof, by the pendulum means from a locked position in which the latch element is engaged by the locking means so as to maintain the latch element in the unlatched position when moved thereto by the belt to an unlocked position in which the latch element is disengaged by the locking means so as to release the latch element for return to the latched position.

2. A seat belt retractor as described in claim 1, wherein the pendulum means comprises a weighted portion and a flange portion supported by the support means and the locking means comprises a locking element movable by the flange portion from the locked to the unlocked position of the locking means when the pendulum means is respectively moved from the unset to the set position thereof.

3. A seat belt retractor as described in claim 2, wherein the pendulum means is inverted with the weighted portion positioned above the flange portion.

4. A seat belt retractor as described in claim 2, wherein the pendulum means has the weighted portion positioned below the flange portion.

5. A seat belt retractor as described in claim 1, wherein the inertia operated means includes guide means joined to the frame, locking means movable along the guide means between a locked position in which the latch element is maintained in the unlatched position and an unlocked position in which the latch element is released for return to the latched position, locking means bias means urging the locking means to the locking position, an inverted pendulum including a lower flange portion seated on the guide means in a set position of the pendulum and engageable with the locking means, an upper weighted portion extending from the guide means and a rod portion interconnecting the weighted and flange portions, the pendulum being tiltable from the set position thereof by inertia forces imposed thereon in any direction and of the certain magnitude so that the flange portion tilts and moves the locking means to the unlocked position.

6. A seat belt retractor as described in claim 5, wherein the locking means includes a locking element arranged to be moved by the pendulum along the guide means and into engagement with the latch element in the locked position of the locking means.

7. A seat belt retractor as described in claim 5, wherein the guide means includes a hollow cylinder fixedly joined at one end thereof to the frame, the cylinder having an elongated, axially extending slot along one side thereof, and the locking means includes a locking element having a sleeve portion slidably positioned within the cylinder and slidable by the pendulum when moved between the set and unset positions thereof and a locking portion extending through the slot so as to engage the latch element in the locked position of the locking means.

8. A seat belt retractor as described in claim 7, further including a cover positioned upon the other end of the hollow cylinder, the cover being arranged to have the rod portion of the pendulum extend therethrough so as to be movable therewith when the pendulum is tilted.

9. A seat belt retractor as described in claim 1, wherein the latch element includes a hook portion arranged to engage the locking means in the unlatched position thereof.

10. A seat belt retractor as described in claim 9, wherein the locking means includes a locking element having a locking portion provided with a cam surface and the latching element hook portion includes a cam surface arranged so as to engage the locking portion cam surface and thereby cam the hook portion and the locking portion relative to each other and into an interlocking relationship in the locked position of the locking means and the unlatched position of the latch element.

11. A seat belt retractor as described in claim 5, wherein the guide means includes a piston fixedly joined to the frame and having the pendulum flange seated thereon, and the locking means includes a locking element having a sleeve portion slidably positioned on the piston and arranged to be moved by the pendulum and a locking portion engageable with the latch element in the locked position of the locking means, the sleeve portion having an open end through which the pendulum rod portion extends.

12. A seat belt retractor as described in claim 11, further including a cover positioned on the open end of the locking element sleeve portion and arranged to move with the pendulum when tilted.

13. A seat belt retractor as described in claim 1, wherein the inertia operated means includes a housing joined to the frame and having an open upper end and a bottom seating surface below the upper end thereof, locking means supported by the housing for movement between a locked position in which the latch element is maintained in the unlatched position and an unlocked position in which the latch element is released for return to the latched position, a pendulum including a flange portion seated in the set position thereof on the housing seating surface and engageable with the locking means, the pendulum also having and downwardly depending weighted portion operatively connected to the flange portion, the pendulum being tiltable from the set position thereof by inertia forces and imposed thereon in any direction and of the certain magnitude so that the flange portion tilts and moves the locking means to the unlocked position.

14. A seat belt retractor as described in claim 13, wherein the locking means includes a locking element pivotally joined at one end thereof to the upper end of the housing so that in the locked position of the locking means the locking element serves as a cover for the upper end of the housing, the locking element having a locking portion at the other end thereof engageable with the latch element in the locked position of the locking means.

15. A seat belt retractor as described in claim 14, wherein the locking portion includes a cam surface and the latch element includes a belt engaging portion arranged to engage the belt when retracted and a hook portion arranged to engage the locking portion in the locking position of the locking means, the hook portion including a cam surface arranged so as to engage the locking portion cam surface and thereby cam the hook portion and the locking portion relative to each other and into an interlocking relationship in the locked position of the locking means and the unlatched position of the latch element.

* * * * *

UNITED STATES PATENT OFFICE
CERTIFICATE OF CORRECTION

Patent No. 3,850,383     Dated November 26, 1974

Inventor(s) Gerald F. Lewis

It is certified that error appears in the above-identified patent and that said Letters Patent are hereby corrected as shown below:

Column 2, line 45, after "18." delete "Th" and insert --The--.

Column 3, line 20, after "a" delete "felt" and insert --belt--.

Signed and sealed this 1st day of April 1975.

(SEAL)
Attest:

RUTH C. MASON
Attesting Officer

C. MARSHALL DANN
Commissioner of Patents
and Trademarks